March 5, 1968  YOSHIAKI KOREKI ET AL  3,371,573
BRAIDING MACHINES
Filed Sept. 26, 1966  4 Sheets-Sheet 1
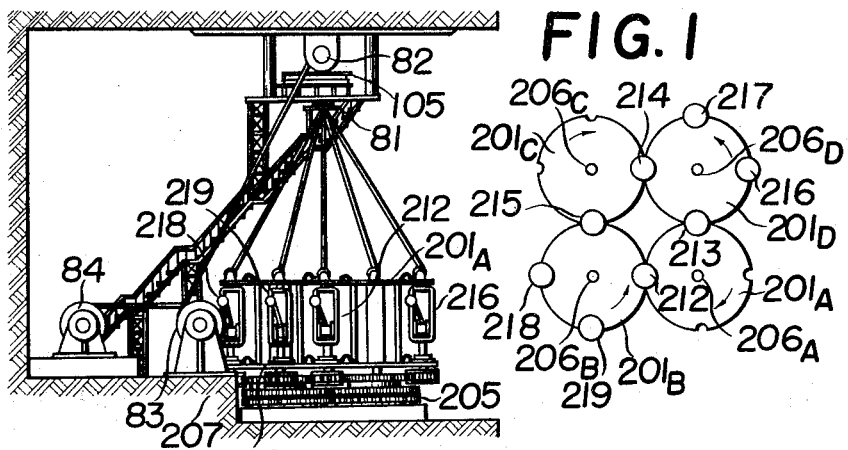
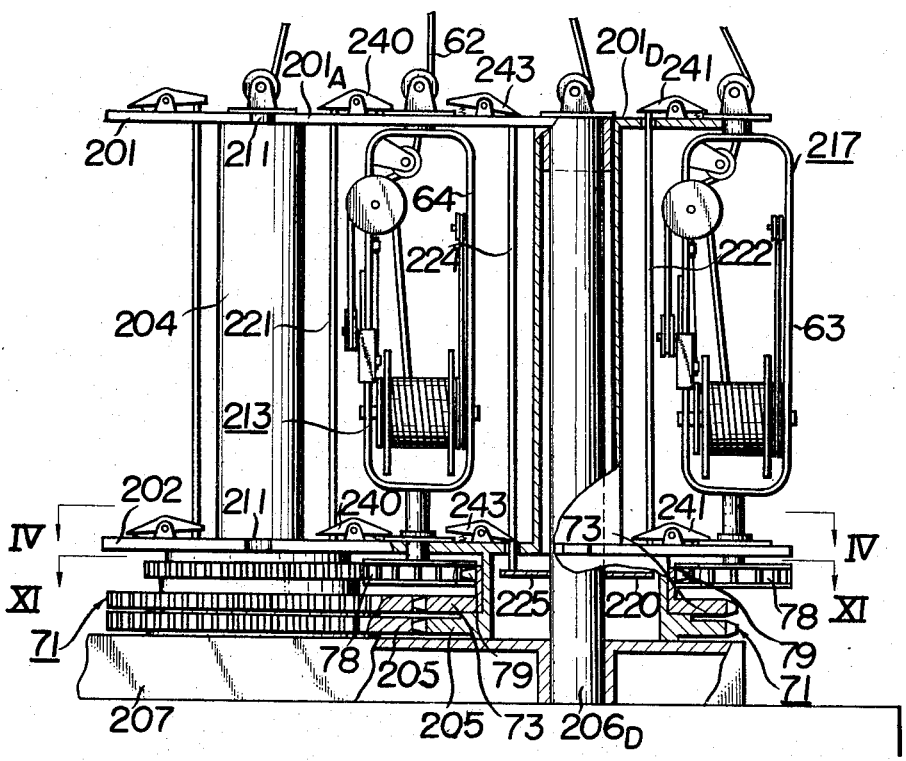
INVENTORS
Yoshiaki Koreki
Ryosuke Kondo
BY
George B. Oujevolk
Attorney March 5, 1968  YOSHIAKI KOREKI ET AL  3,371,573
BRAIDING MACHINES Filed Sept. 26, 1966  4 Sheets-Sheet 2

Yoshiaki Koreki
Ryosuke Kondo
INVENTORS

BY Georges Aupérolle

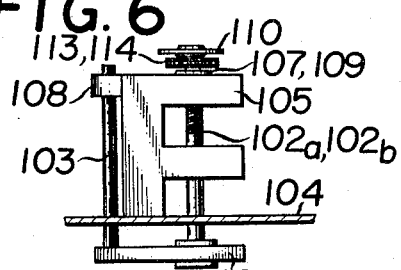
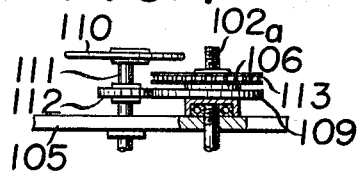
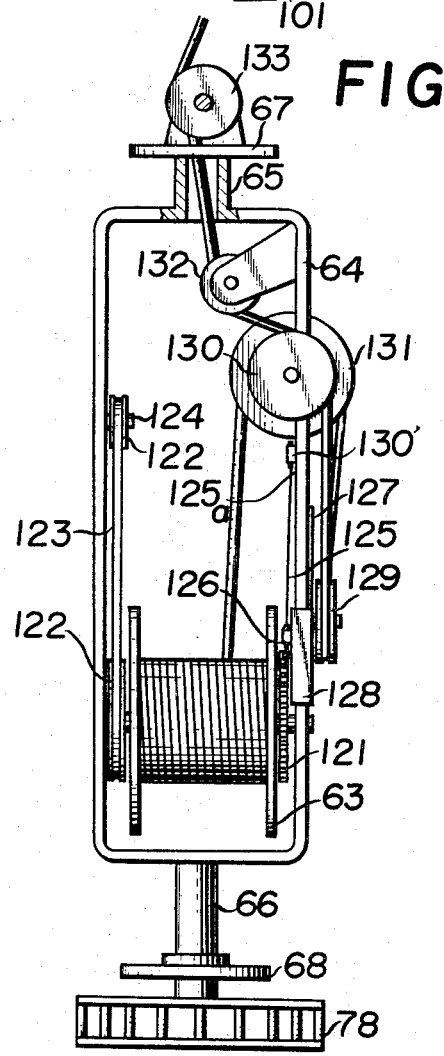
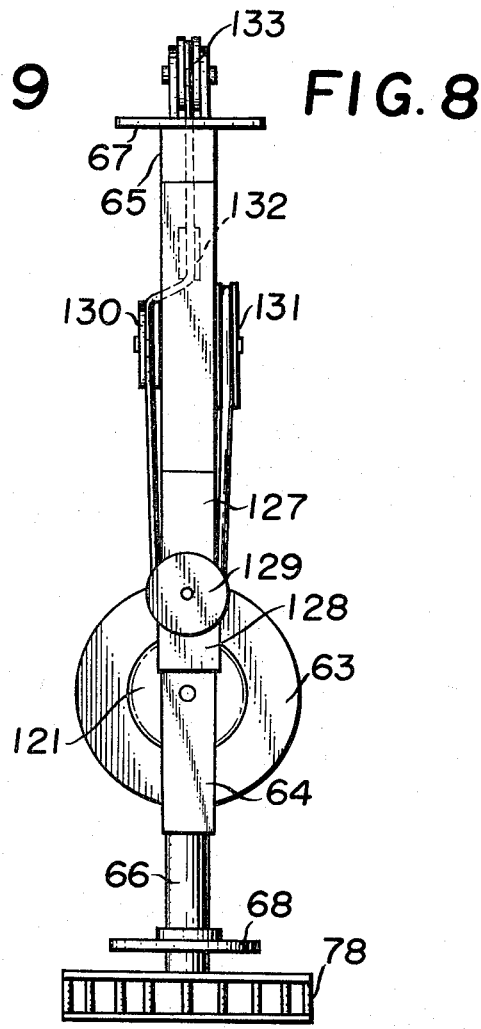

United States Patent Office 3,371,573
Patented Mar. 5, 1968

3,371,573
BRAIDING MACHINES
Yoshiaki Koreki, 6-225 Asagaya, Suginami-ku, Tokyo, Japan, and Ryosuke Kondo, 27-3 Higashinakahata, Katahara-machi, Gamagohri-shi, Aichi-ken, Japan
Continuation-in-part of application Ser. No. 402,720, Oct. 9, 1964. This application Sept. 26, 1966, Ser. No. 581,867
3 Claims. (Cl. 87—37)

ABSTRACT OF THE DISCLOSURE

A braiding machine with rotating disc assemblies and bobbin carriers mounted thereon. The bobbin carriers are rotated at the same angular velocity as the disc assemblies but in a reverse direction of rotation to that of the disc assemblies.

---

This application is a continuation-in-part application of applicants' copending application Ser. No. 402,720, filed Oct. 9, 1964, and now abandoned.

This invention relates to braiding machines, and more particularly to a braiding machine for manufacturing braided ropes utilized as float wires and weight wires of fixed fishing nets, drawing wires for fishing boats, hawsers for ships.

A rope making machine has been proposed in which each of eight bobbin carriers is caused to travel one of two-hypo-epicycloidal paths, which intersect. The bobbin carriers include four discs. These discs have notches and mechanisms to transfer a bobbin carrier from a notch of one disc to a notch of another disc so that a bobbin carrier will travel an allotted locus. Due to rotation of the bobbin carriers about their own axes while they travel, a reverse twist or an excess twist may be formed in the strands. When a reverse twist is formed, strands in the outer layer of a braided rope may become loosened whereas an excess twist may loosen the strands in the central portion of the braided rope. In any case, uneven twisting results, thus lowering the strength of the braided rope. In order to prevent a decrease in the strength caused by such a variation in the strand twisting, it has been the practice to rotate the bobbin carriers in reverse to the rotation of each disc assembly when each bobbin carrier reaches a predetermined point on its locus to restore the twist applied to the strands.

However, as the braiding operation is continuous, it is impossible to uniformly manufacture braided ropes, especially with large sized machines for manufacturing ropes having a large diameter because in such machines the diameters of the discs are large and hence the distance between predetermined points.

An object of this invention is to provide a braiding machine having means to rotate bobbin carriers at the same angular velocity as that of disc assemblies but in a reverse direction of rotation to that of the disc assembly supporting the bobbin carriers for manufacturing braided ropes without reverse twist or excess twist described above.

In order that the invention may be well understood, there will now be described one embodiment thereof, given by way of example only, reference being made to the accompanying drawings, in which:

FIGURE 1 is a schematic plan view of a braiding machine embodying this invention;

FIGURE 2 is a diagrammatic elevation of the machine shown in FIGURE 1 and the construction associated therewith;

FIGURE 3 is a side view of two disc assemblies, bobbin carriers and gear assemblies, partly in section;

FIGURE 6 is a side elevation of a voice mechanism shown in FIGURE 5;

FIGURE 7 is a longitudinal section of a portion of the mechanism taken along a line VII—VII of FIGURE 5;

FIGURE 8 is a side view of a bobbin carrier;

FIGURE 9 is a front view, partly in section, of the bobbin carrier shown in FIGURE 8;

Figure 11A:
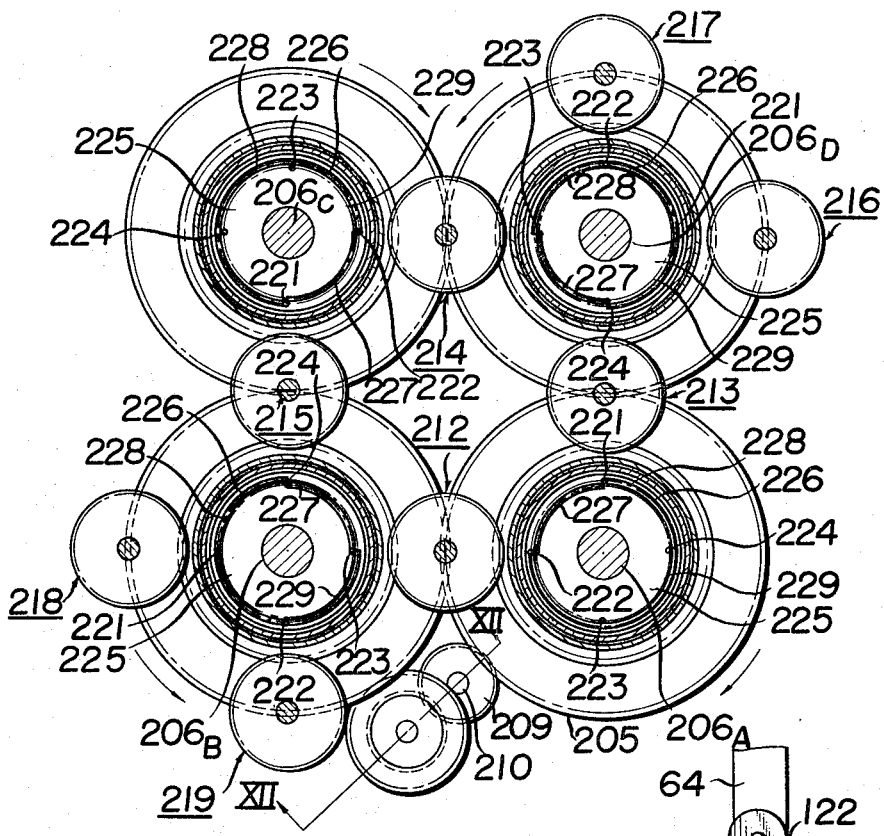

FIGURES 11(a) and (b) are a plan view of the section taken along a line XI—XI of FIGURE 3 and a side elevation of the section taken along a line XII—XII of FIGURE 11(a), respectively.

Figure 11B:
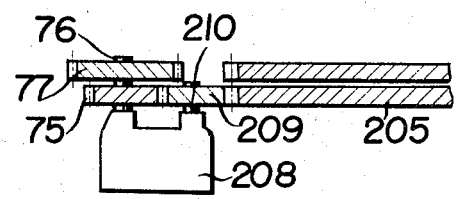
Figure 10:
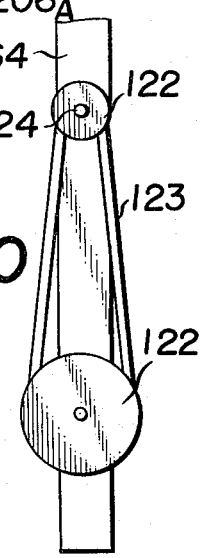
FIGURE 10 shows a side view of a brake of the bobbin carrier shown in FIGURE 9.

Referring now to FIGURES 1, 2 and 3 of the accompanying drawings, there are four disc assemblies 201A, 201B, 201C and 201D, each including upper and lower discs 201 and 202 (FIGURE 3) which are interconnected by a cylindrical shaft 204 provided with a large gear 205. Each shaft surrounds and is rotatable relative to a vertical column, the columns being indicated at 206A, 206B, 206C and 206D, and being located on a base 207 at the corners of a square. Each of the upper and lower discs 201 and 202 of the assemblies 201A, 201B, 201C and 201D is in contact with adjacent discs and adjacent gears 205 mesh with each other. The gear 205 of the assembly 201A is driven by an electric motor 208, as shown in FIGURE 11(b) through a pinion 209 mounted on an intermediate shaft 210. The gears 205 provided to assemblies 201A, 201B, 201C and 201D are driven at a common angular velocity in the direction indicated by arrows in FIGURE 1. The respective disc assemblies are provided with four pairs of notches 211 for fitting bobbin carriers 212, 213, 214 . . . 219, each pair of notches comprising a notch provided on the upper disc and a notch provided on the lower disc facing the upper disc notch. The four notches provided on the disc are equally spaced around the outer circumference of the disc as will be described later in more detail. Pairs of notches are positioned such that each pair of notches provided on one of the disc assemblies will be brought into face to face relationship with a pair of notches of an adjacent disc assembly at certain time intervals as the assemblies are rotated.

Means 220 for engaging and disengaging the bobbin carriers to the notches are associated with each of said disc assemblies and each has identical construction, therefore only the cam means associated with the first disc assembly 201A will be described in detail. Between the upper and lower discs 201 and 202, there are vertical cam rods 221, 222, 223 and 224 to correspond to said notches. The cam rods extend loosely through the upper and lower discs 201 and 202 with their lower ends slidably supported upon a cam plate 225 which is secured on the column 206A. Said cam rods 221 and 222 are both at a first distance from the column axis, while the cam rods 223 and 224 are both located at a second distance from the column axis. Further, said cam plate 225 has two raised facing cams 226 and 227 which are respectively mounted on circumferential lines 228 and 229, the lower end of said cam rods travelling thereon. Hooks 230, 231, 232, 233 and 240, 241, 242, 243 which are respectively pivoted on the upper and lower discs 201 and 202 opposite to each of said notches, the inner ends of the hooks being pivotally connected with said cam rods.

In each of the bobbin carriers 212 . . . 219, a bobbin 63 (FIGURES 8 and 9) having a strand 62 wound thereon is removably mounted in a frame 64 which is provided with shafts 65 and 66, at its upper and lower ends, respectively. These shafts 65 and 66 carry flange-shaped supporting plates 67 and 68, respectively. The upper and lower shafts 65 and 66 of each of the eight bobbin carriers engages notches of the respective disc assemblies and each of the supporting plates 67 and 68 is supported on the upper and lower discs 201 and 202, respectively. Said bobbin carriers are grouped into two sets respectively consisting of four bobbin carriers travelling along one of two mutually perpendicularly arranged hypo-epicycloidal loci which are formed with said disc assemblies. Further said bobbin carriers respectively have on the lower end of the lower shaft 66 a pin gear 78 which is a part of gear means 71. In this embodiment, the bobbin carriers 212, 213, 214 and 215 will travel on one of said hypo-epicycloidal loci, while bobbin carriers 216, 217, 218, 219 will travel along the other of said loci as the disc assemblies rotate. When the notches of the disc assemblies 201B, 201D come into alignment with the notches of the adjacent disc assemblies 201A, 201C each bobbin carrier is transferred from one disc assembly to the adjacent disc assembly, i.e., as shown in FIGURE 11(a), under the state which cam rods 221, 222 of each disc assembly are sliding along a line 228 and cam rods 223, 224 are sliding along a line 229. In this case the cam rods 221 of the disc assemblies 201A, 201C are raised and the cam rods 224 of the disc assemblies 201B, 201D are dropped by their cams, the cam rods 222 of the disc assemblies 201B and 201D are about to drop and the cam rods 221, 222 of the disc assemblies 201B, 201D are taken on the raised facing cams, and the cam rods 223, 224 of the disc assemblies 201A, 201C are static axially. Therefore, hooks 240 of the disc assemblies 201A, 201C engage the bobbin carriers 213, 215, while hooks 243 of the disc assemblies 201B, 201D disengage the bobbin carriers 213, 215, and hooks 242 of the disc assemblies 201B, 201D engage the bobbin carriers 212, 214, while hooks 241 of disc assemblies 201A, 201C disengage bobbin carriers 212, 214. Accordingly, during such continual operation, the grouped bobbin carriers will be respectively travelled on one of the hypo-epicycloidal loci.

In FIGURE 3 is illustrated means for rotating the bobbin carriers at the same angular velocity as that of the disc assemblies but in reverse direction of rotation to that of the assembly supporting it. The means is preferably formed as a gear mechanism described as follows. A gear means 71 located on each of the disc assemblies comprises a set of two stage gears 73 and 79 which are loosely fitted around the cylindrical shaft 204 of each disc assembly, said gear 73 having the same diameter as that of the gear 205. The larger gears 73 of each set are meshed with each other and the gear 73 of the second disc assembly 201B is connected to a pinion 77 secured to a drive shaft 76 of the motor 208, a pinion 75 secured thereon is meshed with a pinion 209 secured on an intermediate shaft 210.

Thus, the rotation of the electric motor 208 is transmitted to the larger gear 73 of the second disc assembly 201B and hence to the larger gear 73 of the other disc assemblies, thus driving all the two stage gears at the same speed. The upper gear 79 of each two stage gear has a smaller diameter than that of the lower gear 73 and has pointed cycloidal teeth adapted to engage a pin wheel 78. In this case, to equate the angular velocity of the pin wheel 78 opposite to that of the gear 205 a gear ratio of the gear means is decided, so that the bobbin carriers are respectively travelled on the hypo-epicycloidal loci self-rotating with respect to the disc but without rotating with respect to the base. In this way reverse twisting and excess twisting due to revolution of the bobbin carriers are positively prevented and since the rotation of the bobbin carriers is continuously controlled without stopping the revolution of them it is possible to operate the machine at a high speed.

Figure 4:
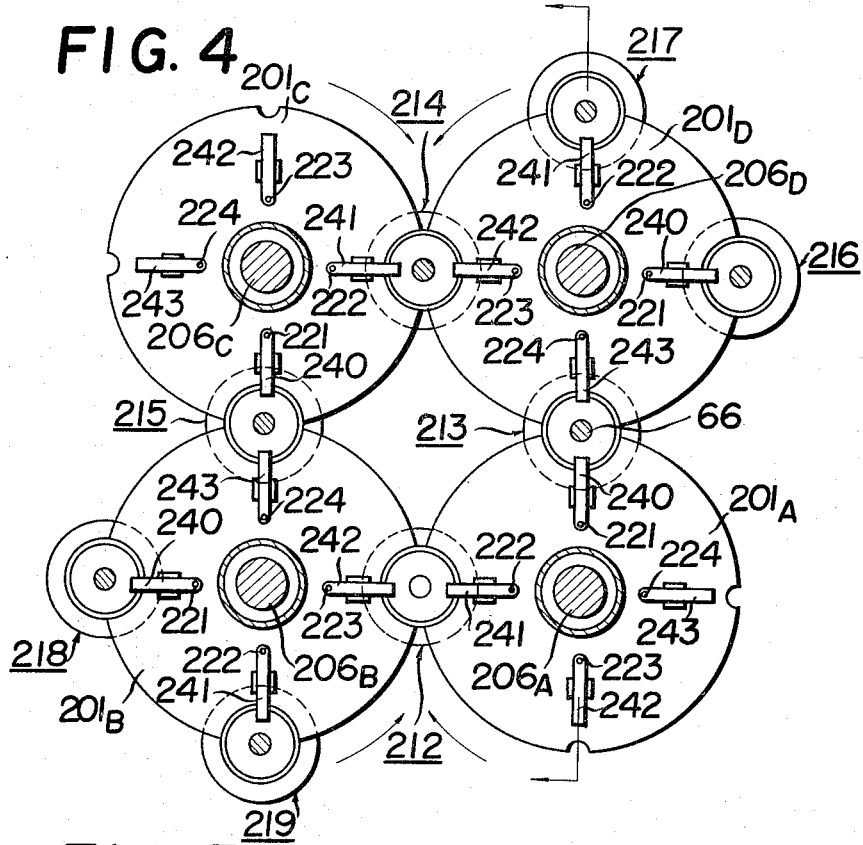
FIGURE 4 is a sectional plan view of the machine taken along a line IV—IV of FIGURE 3.
Figure 5:
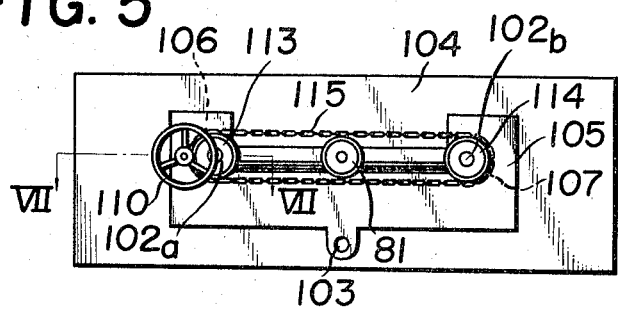
FIGURE 5 is a plan view of a mechanism for adjusting a rotary die.

As shown in FIGURES 5 to 7, in accordance with this invention a rotary die 81 is removably mounted on a supporting frame 101. Projecting from the supporting frame 101 there is provided a pair of screw rods 102a and 102b and a guide rod 103. A supporting frame 105 is mounted on a platform 104 which may be either supported on the ground, or suspended from an overhead structure (not shown). On the opposite sides of the supporting frame 105, there are secured a pair of screwed bushings 106 and 107 which receive said screw rods 102a and 102b, respectively, and a bushing 108 slidably receiving the guide rod 103 is secured on the rear side of the frame 101. A coaxial gear 109 is secured to the left-hand screwed bushing 106 to mesh with a gear 112 secured on a shaft 111 which is journalled in the supporting frame 105 and is provided with a handle 110 on its upper end. By rotating the handle 110, the screwed bushing 106 is rotated through gears 112 and 109. Coaxial with each of the screwed bushings 106 and 107 are secured chain wheels 113 and 114, respectively, around which is mounted an endless chain 115. Thus, the rotation of the screwed bushing 106 is transmitted to the other screwed bushing 107 through the chain wheels 113, 114 and the endless chain 115. Rotation of both screwed bushings 106 and 107 results in the vertical movements of the screw rods 102a and 102b which are engaging these bushings to raise or lower the rotary die 81 supported by the supporting frame 101. While this adjustment is made the guide rod 103 prevents the frame 105 from tilting by sliding in the bushing 108.

Although the point of twisting varies vertically dependent upon the pitch of the twisted rope, it is possible to adjust vertically the position of the rotary die 81 to always position it at the point of twisting to correspond to such variation. With a machine having a fixed or non-adjustable die, when the die is positioned below the point of twisting then untwisted strands will enter the die so that the strands will be subjected to undue stress, and hence damaged. If the die is positioned above the point of twisting uneven twisting will result. However, since according to this invention it is possible to position the die exactly at the position of twisting, the die always operates most effectively, thus providing ropes of good quality without accompanying various disadvantages mentioned above.

Returning again to the description of the bobbin carrier 61, as shown in FIGURES 1, 8, 9 and 10 a bobbin 63 is removably mounted on the lower portion of the frame 64. The bobbin 63 is wound with a strand 62 and is provided with a ratchet wheel 121 at its one end and a pulley 122 at the other end. An endless brake cord 123 is passed over a pin 124 secured to the inner side of the frame and the pulley 122, so that the friction between the brake cord and the pulley provides the necessary braking force to the bobbin 63. A pawl 125 engages the ratchet wheel 121 to prevent the rotation of the bobbin in one direction. The pawl 125 is pivoted on the frame 64 by a support 126 secured to the inner side of the frame 64 and its upper end 125a is bent outwardly. A movable pulley 129 is mounted on a weight 128 which is slidable along a vertical guide rail 127 secured to the outer surface of the frame 64, said other end 125a of the pawl being pushed by the upper surface of the weight 128 when said weight 128 is allowed to rise on the guide rail 127.

The strand 62 is unwound from the bobbin 63, then supplied to said rotary die 81 around a first fixed pulley 131 mounted on the frame 64 above said movable pulley 129, around the movable pulley 129, a second fixed pulley 130 positioned on the frame 64 slightly below said pulley 131, around the third and fourth pulleys 132 and 133 mounted on the frame 64 above the first pulley 131, twisted into a rope by the die 81 and then pulled by a tension roller 83 (FIGURE 2) to be wound upon a winding drum 84.

In this case since the respective bobbin carriers are moved along said hypo-epicycloidal loci, the distance between the bobbin 63 and the die, and hence the point of twisting varies from time to time. However, when the distance between the bobbin 63 and the die 81 is small the weight 128 is lowered to pull down the movable pulley 129 and as the distance between the die 81 and the bobbin 63 is increased the movable pulley 129 and the weight 128 are raised by the strand 62 whereby the strand is tensioned by the weight 128. Until the weight 128 is raised to a predetermined position, the pawl 125 will not disengage from the ratchet wheel 121 although the pawl is raised together with the weight 128. Thus the bobbin 63 is not permitted to rotate to unwind the strand 62. When the weight 128 is raised to a predetermined level the pawl 125 disengages from the ratchet wheel 121, thus permitting the bobbin 63 to unwind the strand 62 under the tension thereof. Since a braking force is applied to the bobbin by the braking cord 123, the rotation of the bobbin 63 and hence unwinding of the strand are limited to a predetermined extent. As the strand 62 is unwound to decrease the distance between the bobbin 63 and the die 81, the weight 128 will be lowered together with the pawl 125 until it finally engages again the ratchet wheel 121 to stop the rotation of the bobbin 63 and hence unwinding operation of the strand 62. A stopper 130' is provided on the frame 64 in order to prevent the weight 128 from being raised beyond a predetermined level. Also a spring 134 is provided to bias downwardly the pawl 125.

Thus, when the distance between the bobbin 63 and the die 81 is small as determined by the position of the bobbin carrier occurrence of a slack in the strand which is unwound from the bobbin is prevented by the action of the movable weight 128 while at the same time unwinding of the strand from the bobbin is prevented by the ratchet device. On the contrary, when the distance between the bobbin 63 and the die 81 is large the unwinding operation is automatically resumed by the operation of the ratchet device to pay out the strand from the bobbin. In this case some tension is applied to the strand so that it is possible to maintain a substantially constant tension in the strand.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:
1. A braiding machine for manufacturing braided ropes comprising:
 (a) eight bobbin carriers;
 (b) four disc assemblies on which are mounted the eight bobbin carriers, said four disc assemblies being rotatably disposed on four vertical columns located on the corners of a square defining four axes of rotation, each disc assembly including upper and lower discs with four pairs of corresponding notches thereon, said notches serving to hold said bobbin carriers therebetween, said discs being so sized and disposed that the discs on adjacent vertical columns are substantially in tangential contact;
 (c) vertical cam rods between each of said disc assemblies corresponding to each of said pairs of notches, a horizontal cam plate with a cam face, said rods traveling thereon, and, cam hooks pivoted to said cam rods for engaging bobbin carriers on one disc assembly, to transfer said engaged bobbin carrier from one pair of notches on said one disc assembly on one of the columns to the adjacent pair of notches of the adjacent disc assembly on the adjacent column as the pairs of notches on adjacent disc assemblies on adjacent columns arrive at the point of substantially tangential contact so that in operation, four of the bobbin carriers will travel along one hypo-epicyloidal path of travel while the other four will travel a like path of travel, intersecting and normal to the path of travel of the other four carriers; and,
 (d) means for rotating each of the disc assemblies at a common angular velocity and means for rotating the bobbin carriers at the same angular velocity as the disc assemblies, but in a reverse direction of rotation.

2. A machine according to claim 1, including a shaft on each of said bobbin carriers for engaging said notches, a pin wheel mounted on each of said shafts, a two stage gear set rotatably disposed on each of said disc assemblies having a large gear in mesh with the corresponding large gear on the adjacent assemblies and a small gear in mesh with said pin wheel and, driving means for rotating said two stage gear set.

3. A machine according to claim 1, in which each bobbin carrier has a rotatable horizontally disposed removable bobbin, a movable pulley and a weight displaceable vertically, on the bobbin carrier, a ratchet wheel and pawl connected to the bobbin, in such relationship that when the weight is raised, the ratchet is disengaged and when lowered, the pawl engages the ratchet wheel stopping the bobbin rotation, and brake means engaging the pulley for braking the bobbin, a strand wound around the bobbin being supplied out through the pulley for braiding a rope.

References Cited

UNITED STATES PATENTS

| | | | |
|---|---|---|---|
| 952,950 | 3/1910 | Schmidt | 87—38 |
| 1,084,442 | 1/1914 | Jones | 87—37 |
| 3,101,642 | 8/1963 | Beckwith | 87—44 XR |

JOHN PETRAKES, *Primary Examiner.*